United States Patent [19]
Funderburk et al.

[11] Patent Number: 5,711,341
[45] Date of Patent: Jan. 27, 1998

[54] SWING-TYPE CHECK VALVE ASSEMBLY RETAINED WITHIN A VALVE HOUSING BY ABUTTING ENGAGEMENT WITH A VALVE COVER AND A PORT OF THE VALVE HOUSING

[75] Inventors: Robert Vernon Funderburk, Charlotte; Timothy Duane Price, Monroe, both of N.C.

[73] Assignee: Conbraco Industries, Inc., Matthews, N.C.

[21] Appl. No.: 806,115

[22] Filed: Feb. 25, 1997

[51] Int. Cl.$^6$ .................................................. F16K 25/00
[52] U.S. Cl. ............................ 137/454.6; 137/527.2; 137/527.4; 137/557; 251/337
[58] Field of Search ....................... 137/527.2, 527.4, 137/527, 512, 454.6, 557; 251/337

[56] References Cited

U.S. PATENT DOCUMENTS

| | | |
|---|---|---|
| 1,399,791 | 12/1921 | Pierson . |
| 1,871,536 | 2/1932 | Le Bus . |
| 2,515,425 | 7/1950 | Restemeier ........................... 137/527 |
| 2,556,277 | 6/1951 | Hill et al. ........................... 137/527 |
| 2,626,124 | 1/1953 | McCarthy . |
| 2,748,788 | 6/1956 | Duckstein . |
| 3,026,902 | 3/1962 | Ruhl, Jr. . |
| 3,259,144 | 7/1966 | Taplin ........................... 137/557 |
| 3,276,465 | 10/1966 | Wyckoff . |
| 3,283,772 | 11/1966 | Ensign ........................... 137/527.4 |
| 3,313,458 | 4/1967 | Braun . |
| 3,478,778 | 11/1969 | Curtiss et al. . |
| 3,482,603 | 12/1969 | Outcalt . |
| 3,604,453 | 9/1971 | Boitnott ........................... 137/527 |
| 3,789,874 | 2/1974 | Hills ........................... 137/527 |
| 3,817,273 | 6/1974 | Erwin, Jr. ........................... 137/338 |
| 3,817,278 | 6/1974 | Elliott ........................... 137/527 |
| 3,857,408 | 12/1974 | Rhodes et al. ........................... 137/514 |
| 3,870,071 | 3/1975 | Graham et al. ........................... 137/527 |

(List continued on next page.)

OTHER PUBLICATIONS

NR-020 LS "REGEV" with L imit Switch.
A.R.I. Kfar Charuv "REGEV" Check Valve.
Febco Specification Sheet Model 850: Double Check Assembly (Drawings SS 850-1 and SS 850-2).

(List continued on next page.)

*Primary Examiner*—Denise L. Ferensic
*Assistant Examiner*—Joanne Y. Kim
*Attorney, Agent, or Firm*—Kennedy Covington Lobdell & Hickman, LLP

[57] ABSTRACT

A swing-check valve for controlling fluid flow includes a valve housing and a valve assembly that engages a removable cover of the valve housing for rigid positioning of the valve assembly within the interior of the valve housing when the cover is mounted to the housing. Moreover, the valve assembly includes a valve seat subassembly in addition to a clapper subassembly and a spring subassembly. The valve seat subassembly includes a valve seat that is frictionally disposed within a port of the valve housing for controlling fluid flow therethrough when the cover is fastened to the valve housing. The clapper subassembly includes a clapper pivotal between a first position in engagement with the valve seat for blocking fluid flow through the port and a second position for permitting fluid flow through the port. The spring subassembly includes a spring and a spring base engageable with the clapper subassembly for urging the clapper into the first position. In one embodiment, the clapper subassembly includes a pivot arm having a roller which engages the spring base and, in another embodiment, the clapper subassembly includes a cam arm on the clapper which engages the spring base. No fasteners are provided for the valve assembly within the interior of the valve housing and, furthermore, upon the unfastening and removal of the cover, the valve assembly can be removed as a single modular unit from the valve housing by simple manual manipulation.

14 Claims, 3 Drawing Sheets

U.S. PATENT DOCUMENTS

| | | | |
|---|---|---|---|
| 3,974,848 | 8/1976 | Wheatley | 137/102 |
| 3,996,962 | 12/1976 | Sutherland | 137/527.4 |
| 4,019,532 | 4/1977 | Schittek | 137/527 |
| 4,067,356 | 1/1978 | Kreuz | 137/527 |
| 4,188,973 | 2/1980 | Weise et al. | 137/527.4 |
| 4,203,467 | 5/1980 | Cardi | 137/557 |
| 4,249,563 | 2/1981 | Shaw | 137/315 |
| 4,552,174 | 11/1985 | Carl et al. | 137/527.2 |
| 4,569,636 | 2/1986 | Bauer et al. | 417/295 |
| 4,669,500 | 6/1987 | Strelow | 137/514 |
| 4,706,706 | 11/1987 | Page et al. | 137/527.8 |
| 4,989,635 | 2/1991 | Dunmire | 137/527 |
| 5,046,525 | 9/1991 | Powell | 137/512 |
| 5,072,753 | 12/1991 | Ackroyd | 137/527 |
| 5,146,949 | 9/1992 | Retzloff et al. | 137/527 |
| 5,236,009 | 8/1993 | Ackroyd | 137/527 |
| 5,327,933 | 7/1994 | Ishikawa et al. | 137/527.6 |
| 5,439,028 | 8/1995 | Meyer et al. | 137/556 |
| 5,503,176 | 4/1996 | Dunmire et al. | 137/15 |

OTHER PUBLICATIONS

Febco Specification Sheet Model 870: Double Check Assembly (Drawings SS 870–1 and 870–2).

Febco Model 880: Reduced Pressure Backflow Preventer (Drawing SS 880–2).

"Silver Bullet: Ames Model 2000 SS Double Check Backflow Preventer ¾"–2", General Instruction, Maintenance, Testing, and Parts Information," Ames Company, Inc.

SWING-TYPE CHECK VALVE ASSEMBLY RETAINED WITHIN A VALVE HOUSING BY ABUTTING ENGAGEMENT WITH A VALVE COVER AND A PORT OF THE VALVE HOUSING

FIELD OF THE INVENTION

The present invention relates to a check valve and, in particular, to an improved swing-check valve having a valve assembly which is securely retained within a valve housing by abutting engagement with both a removable cover and a port of the valve housing, and which includes a valve seat subassembly, a clapper subassembly, and a spring subassembly connected together as a modular unit.

BACKGROUND OF THE INVENTION

Check valves are well known in the valve industry and have been developed to control backflow of fluids carrying undesirable polluters into a fluid supply. These valves have evolved to become highly specialized in the function and operation. However, these valves are similar in that they all contain spring loaded cheek valves that are biased towards the valve-closed position until fluid pressure acting on the checking members forces the valves open. Typically, a backflow preventer utilizes two check valves in a convention serial combination for preventing the backflow of a fluid.

The pressure required to open a check valve is established by regulation and provides a minimum degree of protection against reverse flow. Furthermore, regulation governing backflow preventers requires that a check valve and associated parts must be removable for inspection and repair for field service without having to remove the valve housing from the fluid conduit system to which it is attached.

In a conventional design, the checking member is a poppet type check in which the movement of the checking member is linear and remains in the fluid path. The energy required to open these check valves must be prodded by the fluid and is created at the source by, for example, a pump. The total energy of the fluid is reduced by friction within the pipes and other obstacles in the fluid conduit system which include these checking members that remain disposed directly in the fluid path once the check valves are open. This energy loss, also known as "headloss," is dissipated to the environment and therefore should be minimized in fluid conduit systems in order to preserve fluid pressure.

Many designs to reduce headloss resulting from poppet check valves have been proposed. One design uses a "swing-check" type design in which the checking member, also called a clapper, rotates about a fixed hinge pin. The swing-check valve is advantageous because it allows the checking member to move out of the path of fluid flow thereby reducing the headloss associated with conventional poppet-check valves. In addition, as is conventionally known, the clapper and spring assembly in these conventional swing-check designs can be oriented so that, as the clapper moves away from the valve-closed position, the torque produced by the spring force about the pivot axis of the clapper through the hinge pin is reduced, thereby further minimizing headloss.

Conventional swing-check valves used in backflow preventers generally incorporate the same components. Typically, the clapper in such valves creates a fluid seal across a valve seat, the valve seat including an opening through which fluid would otherwise flow. The valve seat is usually positioned adjacent a fluid inlet port in a valve housing of the fluid conduit system and typically is mounted by bolts to the valve housing. As the fluid flows through the valve seat, the clapper opens by rotating about a hinge pin that normally lies adjacent and parallel to the valve seat face. Normally, a helical compression spring is used to exert force onto the backside of the clapper, and the quantity of water allowed to flow through the swing-check valve directly depends on the opening angle of the clapper and the spring pressure that acts to oppose this opening. Specifically, the spring usually is compressed between the clapper and some other rigid structure such as the valve housing, and fluid pressure must exceed a predetermined magnitude to overcome the spring force on the clapper in order to open the valve.

A recently invented toggle-linkage swing-check valve is disclosed in Ackroyd, U.S. Pat. No. 5,236,009, which includes a valve assembly that is a modular unit having a clapper subassembly, spring subassembly, and valve seat subassembly connected together as a modular unit. A novel feature of the valve is the spring of the spring subassembly being pivotally mounted at opposite ends thereof to the valve seat subassembly and clapper subassembly for the reorientation of the spring force during movement of the clapper subassembly so that the resultant torque applied to the clapper decreases as the clapper moves away from the valve-closed position. The valve assembly is designed to be inserted into an inlet port of a valve housing so that the valve seat of the valve seat subassembly engages the inlet and fluid flow through the housing flows through the valve seat. In particular, as shown in FIG. 9, the valve seat (122), and thus the valve assembly (102), are secured in place by the insertion of two retaining wires (126) into a channel formed by aligned V-grooves (165,163) formed respectively in the valve housing (106) and in the valve seat (122). A disadvantage to the swing-check backflow preventer of Ackroyd is that when the valve requires maintenance, a cover of the valve housing must be removed and then the retaining wires must be removed so that the valve assembly can be manually disengaged from the inlet and then withdrawn from the valve housing. Installation of the valve includes the reverse steps.

Another toggle-linkage swing-check valve is disclosed in Dunmire, U.S. Pat. No. 4,989,635, which includes a valve assembly having a spring subassembly, clapper subassembly, and valve seat subassembly connected together as a modular unit. The spring subassembly is disposed between the clapper of the clapper subassembly and a wall of the valve housing which, preferably according to Dunmire, is a recess in the cover of the valve housing. Moreover, the spring subassembly is pivotally disposed within the recess and pivotally mounted to the clapper for urging the clapper into the valve-closed position so that the torque produced by the spring subassembly on the clapper actually decreases as the clapper pivots away from the valve-closed position. The clapper is attached to the valve seat subassembly which is mounted by bolts to the valve housing. A disadvantage to the sing-check valve of Dunmire is that replacement of the valve assembly consequently requires: (i) the removal of the housing cover; (ii) the removal of the bolts that attach the valve assembly to the valve housing; and (iii) then the withdrawal of the valve assembly from the valve housing with careful supervision of the spring subassembly, which becomes free to pivot about its attachment to the clapper once the cover is removed in step (i). The valve assembly of Dunmire thus presents an awkward handling situation when the valve assembly requires assembly, replacement, or maintenance.

Yet another design for swing-check valves includes the "Regev" valve manufactured by A.R.I. Kfar Charuv of Ramot Hagolan, Israel. The valve includes a valve housing having a spring assembly and a clapper assembly that are disposed adjacent an inlet port of a valve housing. The spring includes a spring base and the clapper assembly includes a clapper having a cam member that remains in continuous engagement with the spring base. The clapper is mounted to the valve housing by a hinge pin and the spring is disposed in a valve housing recess above the clapper assembly so that it is axially compressible in a direction perpendicular to fluid flow through the valve housing and forces engagement of the spring base with the cam member to force the clapper towards the valve-closed position. Moreover, even though the spring does not vary in its orientation during movement of the clapper as in the toggle-linkage designs discussed above, i.e., the spring is not pivotally mounted at its ends, nevertheless, the torque produced by the spring force on the clapper about the hinge pin is reduced as the clapper moves away from the valve-closed position thereby minimizing headloss. A disadvantage to the Regev valve is that, in order to replace any component of the valve assembly or replace the entire valve assembly itself, the entire valve housing must be removed from the fluid conduit system and replaced. Furthermore, comparing the Regev valve to the valves of Ackroyd and Dunmire, it will be immediately apparent that there is no valve assembly disposable within a valve housing in the Regev valve which can be removed from a fluid conduit system without removing the valve housing as required by backflow preventer regulation.

Accordingly, it is therefore an object of the present invention to provide an improved swing-check valve which can be easily and readily removed from and inserted into a valve housing of a fluid conduit system. In particular, it is an object of the present invention to provide an improved swing-check valve which includes together as a modular unit a valve assembly having a valve seat subassembly, a clapper subassembly, and a spring subassembly, and which is supported within the valve housing without the use of fasteners so that the valve assembly can be easily and quickly removed when the valve housing cover is removed.

Yet another objective of the present invention is to provide an improved swing-check backflow preventer which utilizes two swing-check valves of the present invention in serial combination with one another in a conventional manner.

SUMMARY OF THE INVENTION

Each swing-check valve of the present invention includes a valve housing having a port for fluid flow therethrough and a cover that is removable from the valve housing for accessing the interior of the valve housing and that defines a bore therein. Each swing-check valve also includes a valve assembly that is positionable within the interior of the valve housing for controlling the fluid flow through the valve housing and includes as a modular unit: a seat subassembly having a valve seat that is frictionally positionable within the port of the valve housing so that fluid flow through the port flows through the valve seat; a clapper subassembly having a clapper pivotable between a first position in abutting engagement with the valve seat for preventing fluid flow through the port and a second position out of engagement with the valve seat for permitting fluid flow through the port; and a spring subassembly that urges the clapper towards the first position. The spring subassembly is received within the bore of the valve cover for abutting engagement therewith when the valve assembly is disposed within the valve housing and the cover is attached thereto. Thus, the valve assembly is retained and supported within the valve housing by the frictional disposition of the valve seat within the port of the valve housing and by the abutting engagement of the spring assembly within the bore of the cover, and no fasteners are required to be attached to the valve assembly to secure the valve assembly within the valve housing. Moreover, the valve assembly is subsequently removable from the valve housing simply by removing the cover and withdrawing the valve assembly from its frictional disposition in the port of the valve housing.

In one feature of the swing-check valves of the present invention, the cover and the valve housing are threaded so that the cover is attached to the housing by screwing the cover to the housing. Furthermore, the bore and the spring compartment are preferably cylindrically configured whereby the cover rotates about a common axis of the bore and the spring compartment when screwed into the cover.

In another feature of the swing-check valves of the present invention, the spring subassembly is configured so that the spring axially compresses and expands perpendicularly to the direction of fluid flow through the valve housing.

In yet another feature of the swing-check valves of the present invention, the force of the spring subassembly acting on the clapper when in the first position produces a torque that is greater than the torque produced on the clapper when the clapper is out of the first position.

In one embodiment of the swing-check valves of the present invention, the clapper subassembly includes a cam arm attached to the clapper, and the spring subassembly includes a piston-mounted compression spring and a spring base disposed between the spring and the clapper having a surface for engagement with the cam arm for urging the clapper into the first position.

In another embodiment of the swing-check valves of the present invention, the clapper subassembly includes pivot arm attached to the clapper having a roller, and the spring subassembly includes a piston-mounted compression spring and a spring base disposed between the spring and the roller having a surface for engaging the roller. Furthermore, the roller travels along the spring base surface when the spring urges the clapper toward the first position. In a feature of this embodiment, the pivot arm is pivotally attached to the clapper so that the clapper forms a uniform seal with the valve seat when forced by the spring info the first position.

In a swing-check backflow preventer of the present invention, two swing-check valves of the present invention are utilized in linear combination with one another in a conventional manner.

DETAILED DESCRIPTION OF EMBODIMENTS OF THE PRESENT INVENTION

Figure 1:
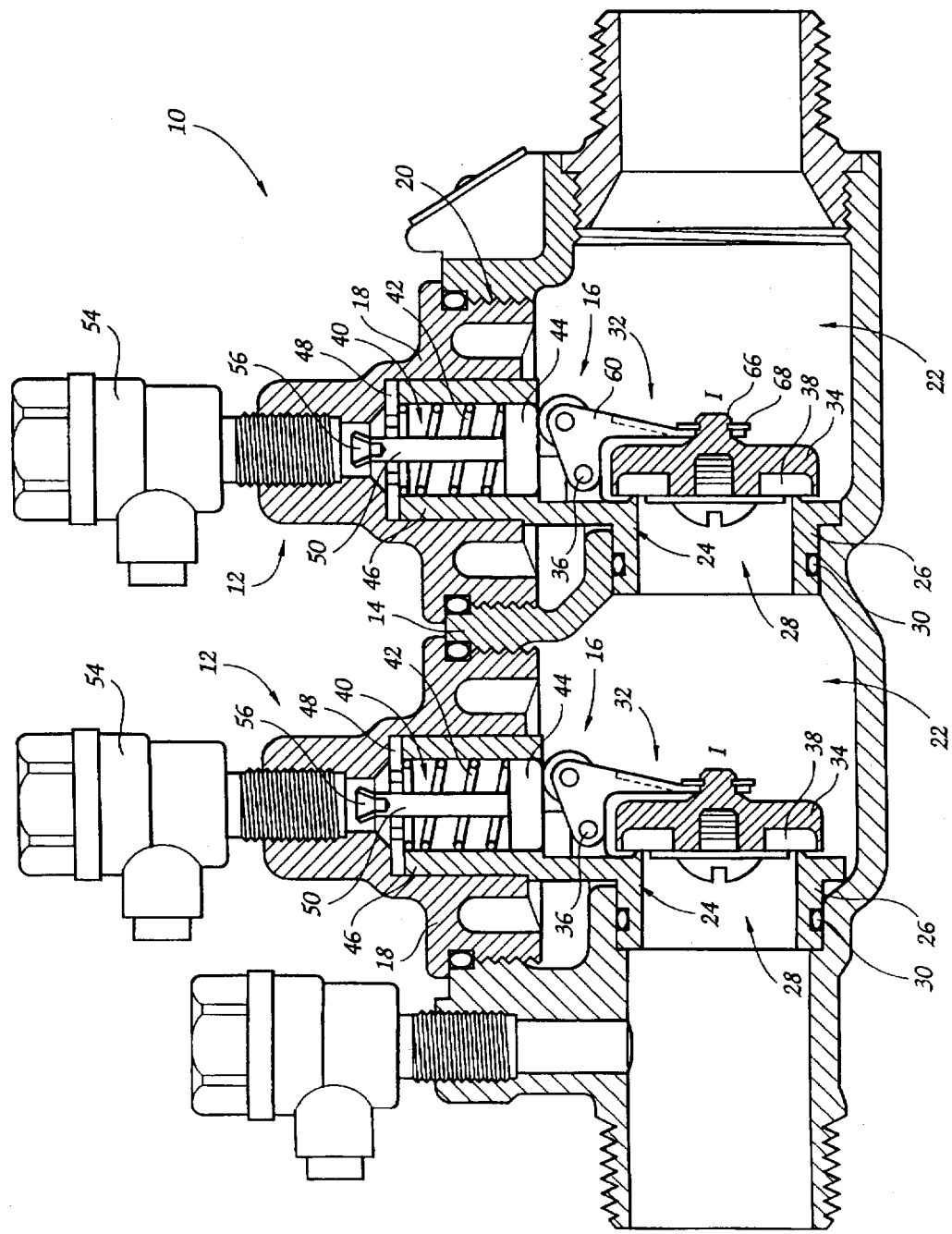
FIG. 1 is a side cross-sectional view of a backflow preventer including a valve housing having two swing-check valves of the present invention in the valve-closed position.

The swing-check valves of the present invention will now be described in detail with reference to the swing-check backflow preventer 10 of FIGS. 1–3, with one embodiment of the swing-check valve being shown in FIGS. 1–2 and an alternative embodiment being shown in FIG. 3, and with like reference numerals being used in referring to like structures therein. Moreover, in the backflow preventer 10 shown in FIGS. 1–3, two swing-check valves 12 of the present invention are provided with both valves 12 of each backflow preventer sharing the same valve housing 14. The serial combination of two swing-check valves in a valve housing to form a backflow preventer is well known in the art and will not be described in detail herein, the present invention residing in the individual structure of each swing-check valve 12 of the present invention. Moreover, as will be recognized by one of skill in the art, FIG. 3 shows a backflow preventer 10 having one swing-check valve open and one swing-check valve closed for illustration purposes only.

The swing-check valves of the present invention are generally shown at 10 and each swing-check valve 12 includes a valve housing 14 and a valve assembly 16. For each swing-check valve 12, the valve housing 14 of each backflow preventer 10 includes a housing cover 18 removably attached by a threads 20 to the valve housing 14 for accessing the interior 22 of the valve housing 14, with each valve assembly 16 being attached to a separate cover 18 of the valve housing 14 in accordance with the present invention.

Each valve assembly 16 of the swing-check valve 12 includes a valve seat subassembly 24 having a valve seat 26 that is frictionally positionable within a port 28 of the valve housing 14 through which the fluid to be controlled by the swing-check valves flows (shown by arrows F). An o-ring 30 preferably is disposed about the valve seat 26 for the forming of a fluid seal between the valve seat 26 and the valve housing 14 so that fluid flow through the valve housing 14 flows through the valve seat 26 and does not leak around the valve seat 26. The valve assembly 16 of each swing-check valve 12 also includes a clapper subassembly 32 having a clapper 34 pivotally mounted by hinge pin 36 to the seat subassembly 24.

The clapper 34 is pivotable between a first position I in which the clapper 34 engages the valve seat 26 and a second position II in which the clapper 34 is pivoted out of engagement with the valve seat 26. When in abutting engagement with the valve seat 26, the clapper 34 in the first position I forms a fluid tight seal thereby blocking fluid flow through the valve seat 26. In particular, the clapper 34 preferably includes a rubber underside 38 which provides a sealing face with the valve seat 26. Conversely, when the clapper 34 moves out of the first position I, the fluid seal formed between the clapper 34 and the valve seat 26 is disbanded and fluid flow through the valve seat 26 is permitted.

A spring subassembly 40 is also included in each valve assembly 16 and includes a piston-mounted compression spring 42 and a spring base 44 disposed between the compression spring 42 and clapper subassembly 32 for urging the clapper 34 into the first position I. In particular, the piston-mounted compression spring 42 is received within a cylindrical spring compartment 46 in abutment against a surface 48 thereof, and the spring compartment 46 includes a piston 50 that extends through the compression spring 42 along its axial extent and that is slidably mounted to the spring compartment 46 for linear reciprocating movement through the surface 48 in the axial direction of the compression spring 42. Moreover, the piston 50 attaches at one end thereof to the spring base 44 so that the compression spring 42 is retained between the spring base 44 and the surface 48 of the spring compartment 46.

The spring subassembly 40, and in particular the spring compartment 46, includes an exterior surface that is received in a bore 52 of the cover 18 for a close fitting relationship therebetween. In particular, the bore 52 is configured and dimensioned to receive the spring compartment in abutting engagement with the exterior surface of the spring compartment 46 when the cover 18 is secured to the valve housing 14. Thus, the spring subassembly 40, and the clapper subassembly 32 and valve seat subassembly 24 to which the spring subassembly 40 is attached, are secured within the interior 22 of the valve housing 14 and prevented from rotational movement within the port 28 about the direction of fluid flow F. Furthermore, the bore 52 preferably extends through the cover 18 and is threaded so that a hydraulic tap 54 (test cock) can be secured to the top of the cover 18 for measuring the fluid pressure in the interior 22 of the valve housing 14 through the spring subassembly 40.

The piston 50 of the spring subassembly 40 includes a stop member 56 within bore 52 that is configured and sized to engage the spring compartment 46 to prevent the piston 50 from sliding entirely through the surface 48 of the spring compartment 46 and to thereby prevent compression spring 42 from expanding to its equilibrium length. Furthermore, the bore 52 for receiving the spring compartment 46 is positioned in the cover 18 so that the spring subassembly 40 lies generally above the clapper subassembly 32, and spring base 44 includes a surface 58 which the compression spring 42 urges into continuous contact with the clapper subassembly 32. Furthermore, the spring subassembly 40 is oriented in the bore 52 of cover 18 so that the compression spring 42 axially compresses and expands perpendicularly to the direction of fluid flow F through the valve housing 14.

Figure 2:
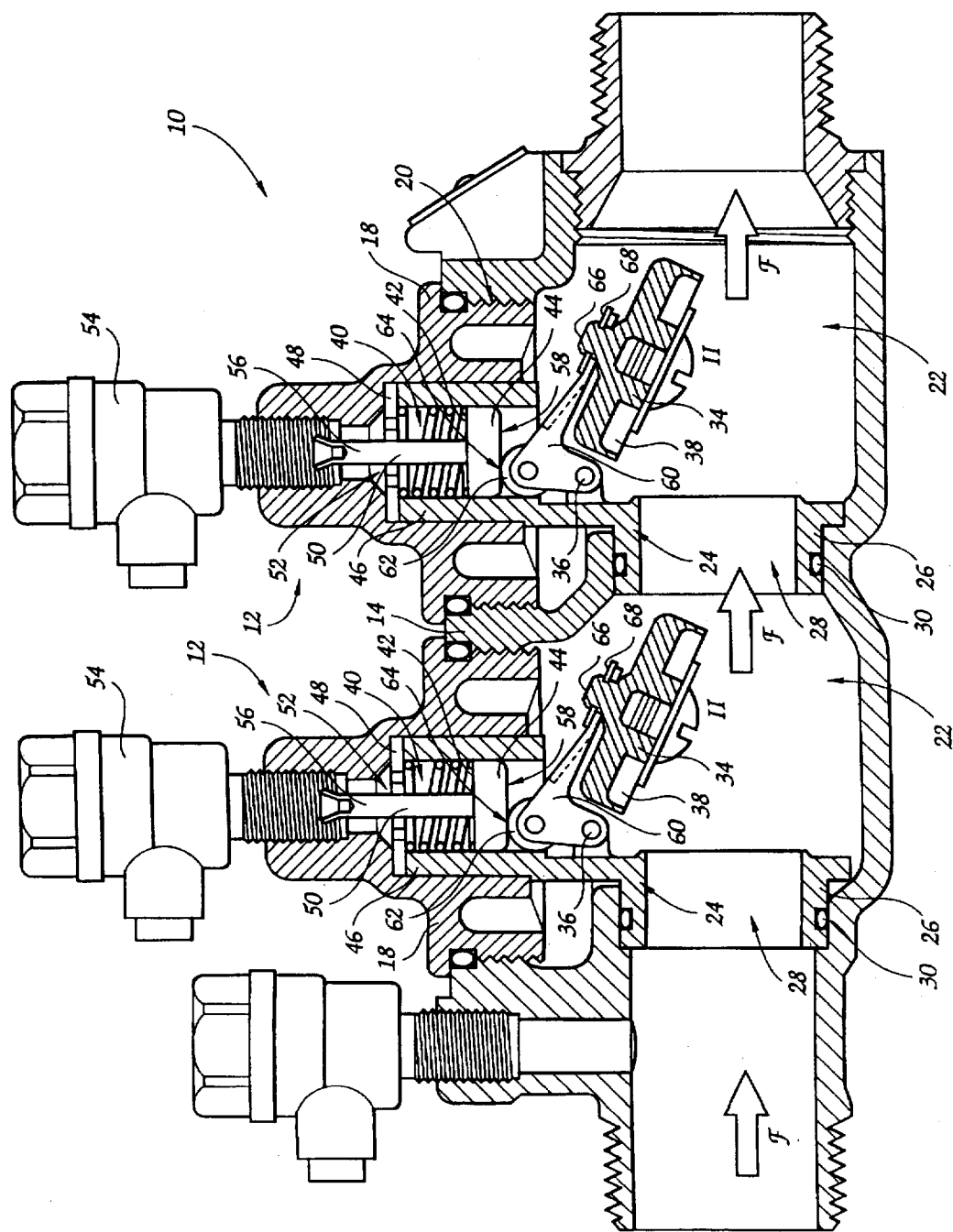
FIG. 2 is a side cross-sectional view of the backflow preventer of FIG. 1 showing the swing-check valves in the valve-open position.
Figure 3:
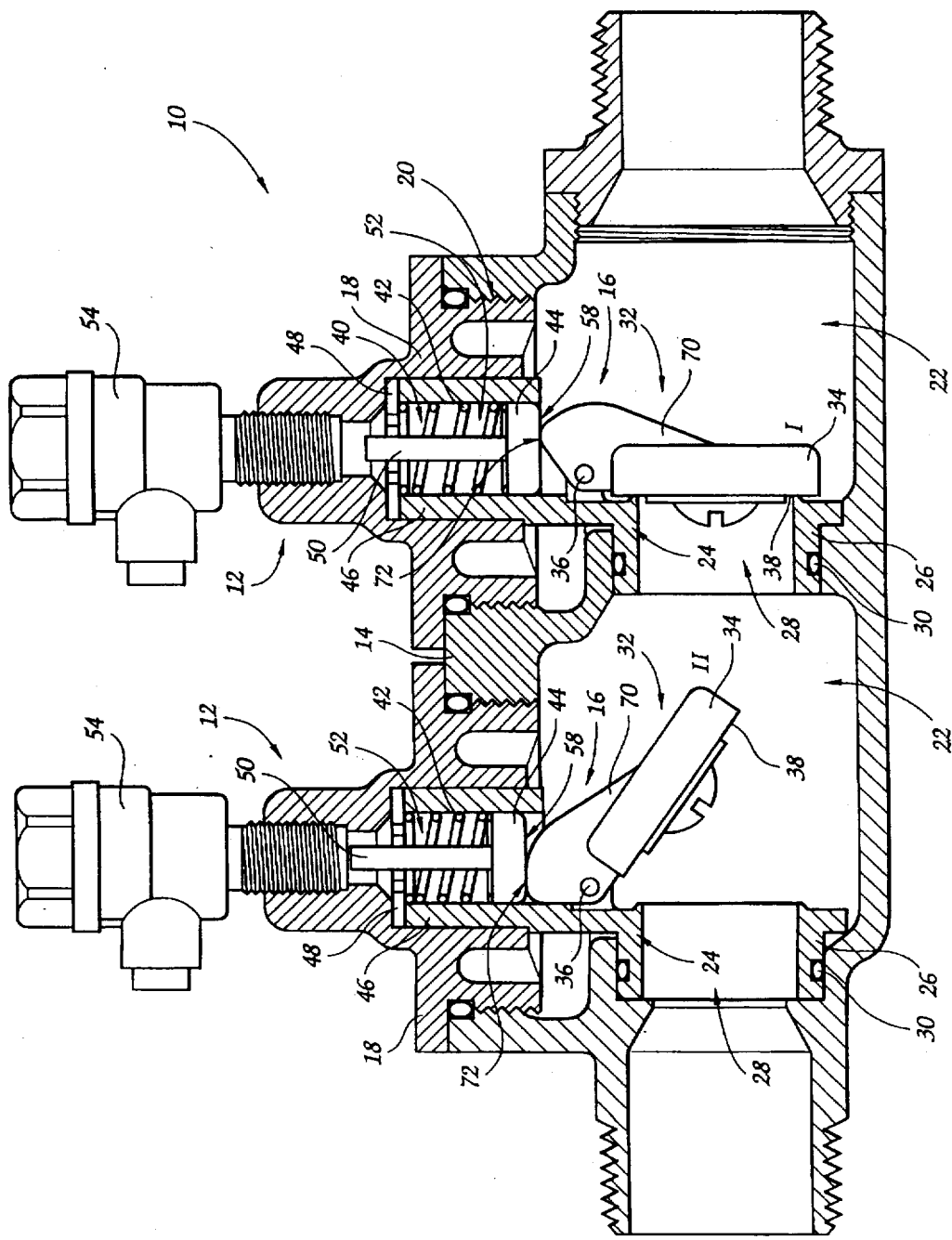
FIG. 3 is a cross-sectional view of a backflow preventer including a valve housing having two alternative swing-check valves of the present invention with one swing-check valve in the valve-closed position and one swing-check valve in the valve-opened position.

In one embodiment of the present invention as shown in FIGS. 1–2, the clapper subassembly 32 includes a pivot arm 60 that is pivotally mounted to the valve seat subassembly 24 and that is mounted to the clapper 34. Furthermore, the pivot arm 60 preferably includes a roller 62 for engaging the surface 58 of the spring base 44. Specifically, the roller 62 rolls along the spring base surface 58 and the point of contact 64 between the surface 58 and the roller 62 continuously moves along the surface 58 during pivotable movement of the clapper 34. The force exerted by the surface 58 on the roller 62 is transferred through the pivot arm 60 to the clapper 34 which results in a fluid seal with valve seat 26 when the clapper 34 is in the first position I. In addition, the pivot arm 60 is preferably connected in a conventional manner to the clapper 34 for slight pivoting movement of the clapper 34 so that a uniform seal is formed between the clapper 34 and the valve seat 26 when the spring 42 forces the clapper 34 into the first position I. For example, the pivot arm 60 preferably includes a circular opening through which a circular boss 66 on the clapper 34 having a lesser diameter extends, with a clip 68 being attached to the boss 66 at a slight spacing from the pivot arm 60 for pivotable shifting movement between the clapper 34 and pivot arm 60.

In another embodiment of the present invention as shown in FIGS. 3, the clapper subassembly 32 includes a cam arm 70 instead of roller 62 for engaging the surface 58 of the spring base 58. Furthermore, the cam arm 70 is profiled so that the abutment 72 between the spring base surface 58 and the cam arm 70 continuously moves along the surface 58 during pivotable movement of the clapper 34. This embodiment including a cam arm 70 is preferable where the parts of the spring and clapper subassemblies are made of small plastic parts and frictional forces therebetween are negligible.

In both embodiments, the compression spring 42 urges the surface 58 into contact with the roller 62 or cam arm 70 so that the clapper 34 is urged towards the first position I. Furthermore, in both embodiments, the point of contact 64 or abutment 72 between the spring subassembly 40 and the clapper subassembly 32 continually extends further away from the hinge pin 36, and pivot axis extending therethrough, as the clapper 34 moves towards the first position I so that the torque produced by the spring subassembly 40 on the clapper 34 about the hinge pin 36 continually increases even though the compression spring 42 expands and, consequently, the spring force produced thereby decreases. Conversely, as the clapper 34 is forced open by fluid pressure and caused to pivotally move out of and away from the first position I, the spring force produced by the compression spring 42 increases but the point of contact 64 or abutment 72 between the spring subassembly 40 and the clapper subassembly 32 moves closer to the hinge pin 36 so that the torque produced on the clapper 34 about the hinge pin 36 continually decreases. Thus, the force of the spring subassembly 40 acting on the clapper 34 when in the first position I produces a torque that is greater than the torque produced by the spring subassembly 40 acting on the clapper 34 when the clapper 34 is out of the first position I. Moreover, when the clapper 34 is fully open the clapper 34 should not be allowed to extend to the position where the spring force acts directly perpendicularly to the hinge pin 36 such that the torque would become zero. Preferably, the roller 62 or the cam arm 70 engage the spring subassembly 40 to prevent pivotal movement of the clapper 34 beyond a desirable distance away from the first position I (see FIGS. 2 and 3).

One of ordinary skill in the art will thus immediately recognize that the swing-check valves 12 of the present invention reduce the headloss associated with the valves 12 by decreasing the "hold-open" fluid pressure required to maintain each valve 12 in the open state after an initial fluid pressure is achieved. This benefit has been recognized, for example, in Dunmire, U.S. Pat. No. 4,989,635, discussed above.

When the swing-check valve 12 is used, a novel feature of the present invention of securing the valve assembly 16 within valve housing 14 without the use of fasteners provides numerous advantageous over the prior art when installing and removing the valve assembly 16. In particular, when the valve 12 requires inspection, maintenance, or replacement, the process of removing the valve assembly 16 from the valve housing 14 requires only that the cover 18 be unscrewed from the valve housing 14 and the valve assembly 16 be manipulated, i.e., transversely displaced in direction R shown in FIG. 1, so that the valve seat 26 is removed from its frictional engagement with port 28 after which it can be simply lifted out of valve housing 14. No fasteners of the valve assembly 16 exists which need be unfastened in the process. This is a distinct advantage over the prior art valves, which do not include a valve assembly that is securely positioned within a valve housing 14 only by the frictional disposition of the valve seat 26 within port 28 and abutting engagement of spring compartment 46 received in bore 52 of the cover 18. The elimination of interior fasteners for the valve assembly eliminates the need for additional machining of threaded bores, etc., during manufacturing for the fastening of the valve assembly to the valve housing within the housing interior, thereby reducing the complexity and expense of the manufacturing process. The swing-check valves of the present invention are also therefore easier to assemble and repair, thereby decreasing labor and service costs. Moreover, the swing-check valves of the present invention, by eliminating interior fasteners, eliminate likely places for corrosion to propagate in iron bodied valves that have an epoxy coating, thereby extending the service life of the valves.

In sum, the valve assembly of the swing-check valves of the present invention, which includes the spring subassembly, the valve seat subassembly, and the clapper subassembly together in a single modular unit, and which is retained within the valve housing without the use of fasteners, makes the swing-check valves of the present invention easier and simpler to assemble, maintain, and replace in a valve housing compared to all other conventional check valves. The cover acts as a sealed access while providing rigid support that the swing-check valve requires to remain stationary in the port of the valve housing, and no fasteners are needed inside of the valve housing, since when the cover is screwed into the valve housing, the check valve has no degree of freedom to move. The port in conjunction with the bore of the cover secure the valve assembly within the valve housing, thereby keeping the valve seat in tight engagement with the port and preventing water from leaking around the valve seat.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A swing-check valve for controlling fluid flow comprising:

a valve housing having a port for fluid flow therethrough, said valve housing including a removable cover for accessing an interior of said valve housing; and a valve assembly disposed within the interior of said valve housing for controlling the fluid flow through said valve housing, said valve assembly including together as a modular unit a seat subassembly including a valve seat that is frictionally positionable within the port of said valve housing so that fluid flow through the port flows through said valve seat, a clapper subassembly having a clapper pivotable between a first position in abutting engagement with said valve seat for preventing fluid flow through the port and a second position out of engagement with said valve seat for permitting fluid flow through the port, and a spring subassembly that urges said clapper towards said first position;

said cover defining a bore therein and said spring subassembly being received within said bore of said valve cover for abutting engagement therewith when said valve assembly is disposed within said valve housing and said cover is attached thereto, and wherein said valve assembly is retained and supported within said valve housing substantially only by said frictional disposition of said valve seat within the port of said valve housing and by said abutting engagement of said spring assembly with said cover, said valve assembly being removable from within said valve housing by removing said cover and withdrawing said valve assembly from its frictional disposition in the port of said valve housing.

2. A swing-check valve according to claim 1, wherein said cover and said valve housing have mating threads for attaching said cover rotationally to said housing, said bore and "said spring compartment" being cylindrical in configuration and oriented about a common axis.

3. A swing-check valve according to claim 1, wherein said clapper arm abuts said spring subassembly when in said second position, thereby preventing further pivoting movement of said clapper away from said first position.

4. A swing-check valve according to claim 1, further including a hydraulic tap connected to said bore of said cover for measuring the fluid pressure within said valve housing through said spring subassembly.

5. A swing-check valve according to claim 1, wherein said clapper subassembly includes a cam arm attached to said clapper, and said spring subassembly includes a surface for engagement with said cam arm for urging said clapper into said first position.

6. A swing-check valve according to claim 1, wherein said clapper subassembly includes a cam arm attached to said clapper, and said spring subassembly includes a piston-mounted compression spring and a spring base disposed between said spring and said clapper having a surface for engagement with said cam arm for urging said clapper into said first position.

7. A swing-check valve according to claim 6, wherein said spring is configured to axially compress and expand perpendicularly to the direction of fluid flow through said valve housing.

8. A swing-check valve according to claim 7, wherein the force of said spring subassembly acting on said clapper when in said first position produces a torque that is greater than the torque produced by said spring subassembly acting on said clapper when said clapper is out of said first position.

9. A swing-check valve according to claim 1, wherein said clapper subassembly includes a pivot arm having a roller attached to said clapper, and said spring subassembly includes a surface for engaging said roller for travels along said surface for urging said clapper into said first position.

10. A swing-check valve according to claim 1 wherein said clapper subassembly includes a pivot arm having a roller attached to said clapper, and said spring subassembly includes a piston-mounted compression spring and a spring base disposed between said spring and said pivot arm having a surface, wherein said roller engages and travels along said surface of said spring base for urging said clapper into said first position.

11. A swing-check valve according to claim 10, wherein said cam arm is pivotally attached to said clapper so that said clapper forms a uniform seal with said valve seat when forced into said first position by said spring.

12. A swing-check valve according to claim 10, wherein said spring is configured to axially compress and expand perpendicularly to the direction of fluid flow through said valve housing.

13. A swing-check valve according to claim 12, wherein the force of said spring subassembly acting on said clapper when in said first position produces a torque that is greater than the torque produced by said spring subassembly acting on said clapper when said clapper is out of said first position.

14. A swing-check backflow preventer comprising:

two swing-check valves disposed within a valve housing in linear combination with one another, said valve housing including two ports for fluid flow therethrough and at least one removable cover, and each swing-check valve including a valve housing having a port for fluid flow therethrough, said valve housing including a removable cover for accessing an interior of said valve housing, said cover defining a bore therein; and a valve assembly disposed within the interior of said valve housing for controlling the fluid flow through said valve housing, said valve assembly including together as a modular unit a seat subassembly including a valve seat that is frictionally positionable within the port of said valve housing so that fluid flow through the port flows through said valve seat, a clapper subassembly having a clapper pivotable between a first position in abutting engagement with said valve seat for preventing fluid flow through the port and a second position out of engagement with said valve seat for permitting fluid flow through the port, and a spring subassembly that urges said clapper towards said first position;

wherein said spring subassembly is received within said bore of said valve cover for abutting engagement therewith when said valve assembly is disposed within said valve housing and said cover is attached thereto, and wherein said valve assembly is retained and supported within said valve housing only by said frictional disposition of said valve seat within the port of said valve housing and by said abutting engagement of said spring assembly with said cover, said valve assembly being removable from within said valve housing by removing said cover and withdrawing said valve assembly from its frictional disposition in the port of said valve housing.

* * * * *

UNITED STATES PATENT AND TRADEMARK OFFICE
CERTIFICATE OF CORRECTION

PATENT NO. : 5,711,341
DATED : January 27, 1998
INVENTOR(S) : Robert Vernon Funderburk; Timothy Duane Price It is certified that error appears in the above-identified patent and that said Letters Patent is hereby corrected as shown below:

Column 1, line 19, delete "polluters" and insert -- pollutants --

Column 1, line 20, delete "the function" and insert -- their function --

Column 1, line 22, delete "cheek" and insert -- check --

Column 1, line 25, delete "convention" and insert -- conventional --

Column 1, line 38, delete "prodded" and insert -- provided --

Column 2, line 55, delete "sing-check" and insert -- swing-check --

Column 4, line 45, delete "info' and insert -- into --

Column 9, line 13, delete " "said spring compartment" " and insert -- a spring compartment --

Signed and Sealed this

Fifth Day of January, 1999

Attest:

Attesting Officer

*Acting Commissioner of Patents and Trademarks*